United States Patent
Takahashi et al.

(10) Patent No.: US 7,175,530 B2
(45) Date of Patent: Feb. 13, 2007

(54) SERVER DEVICE FOR NET GAME, NET GAME MANAGEMENT METHOD, NET GAME MANAGEMENT PROGRAM AND RECORDING MEDIUM WHICH STORES NET GAME MANAGEMENT PROGRAM

(75) Inventors: Hidehisa Takahashi, Amagasaki (JP); Tatsuya Ishikawa, Takarazuka (JP); Kazuhiro Namba, Amagasaki (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 47 days.

(21) Appl. No.: 10/157,659

(22) Filed: May 29, 2002

(65) Prior Publication Data

US 2002/0183114 A1    Dec. 5, 2002

(30) Foreign Application Priority Data

May 30, 2001    (JP)    ............................. 2001-162863

(51) Int. Cl.
    *A63F 9/24*    (2006.01)
(52) U.S. Cl. ............................... 463/41; 463/40; 463/3
(58) Field of Classification Search ............ 463/40–42, 463/3
    See application file for complete search history.

(56) References Cited

U.S. PATENT DOCUMENTS 4,592,546 A * 6/1986 Fascenda et al. ............ 463/29
5,634,084 A * 5/1997 Malsheen et al. ........... 704/260
6,494,783 B2 * 12/2002 Namba et al. ................ 463/3

FOREIGN PATENT DOCUMENTS

| EP | 1 031 912 | 8/2000 |
| EP | 1 078 667 | 2/2001 |
| JP | 2001-120841 | 5/2001 |
| JP | 2001-137536 | 5/2001 |
| JP | 2001-259224 | 9/2001 |
| KR | 1999-0041640 | 6/1999 |
| KR | 2000-0072710 | 12/2000 |
| WO | WO 95/31061 | 11/1995 |
| WO | WO 97/19537 | 5/1997 |
| WO | WO 00/29084 | 5/2000 |

OTHER PUBLICATIONS

Maloni et al., Net Games, Your Guide to the Games People Play on the Electronic Highway, 1994, Michael Wolff & COmpany, pp. 218, 219.*
1942 The Pacific Air War Scenario—Instruction Manual: HD82290 MFFPRT Job—Feb. 14, 2006.
Instructional Manual: Ultimate Soccer Manager '98, Cendant Software Int'l, United Kingdom.

* cited by examiner

*Primary Examiner*—Corbett B. Coburn
(74) *Attorney, Agent, or Firm*—Jordan and Hamburg LLP

(57) ABSTRACT

A server device communicates with terminal devices used by users and manages a baseball game. The server acquires messages which a first user has selected from a plurality of predetermined messages. The server then presents a corresponding message of the messages acquired to a second terminal device, which is operated by a second user, at corresponding times of predetermined times during a period when the users are playing the baseball game. The predetermined times include a game start time and a batting/fielding change time.

15 Claims, 11 Drawing Sheets

SERVER DEVICE FOR NET GAME, NET GAME MANAGEMENT METHOD, NET GAME MANAGEMENT PROGRAM AND RECORDING MEDIUM WHICH STORES NET GAME MANAGEMENT PROGRAM

BACKGROUND OF THE INVENTION

1. Field of the Invention

The present invention relates to a server device for net games (or network games) which is communicably connected to a plurality of terminal devices used by users via a network for managing a game played in a game space by the users using the terminal devices, a network game management method, a net game management program used for this device and a recording medium which stores a net game management program.

2. Description of the Related Art

Today as the Internet becomes popular and data transfer speeds increase, net games (or network games) using server devices for net games, and terminal devices used by users which are connected via the Internet, are commonly played. With such net games, various matching games, including sports and physical combat, are played.

In the case of the above mentioned matching games, an unspecified number of general users can participate in a game since the Internet is used. When unknown users match in this way, the capability of an opponent in a game is unknown, so unexpectedness is added to the progress of a game, and some excitement can be added to a game compared with normal games which use a standalone game machine, where a game is played with the game machine as the opponent.

However if games are simply played between users via the server device for net games, as mentioned above, the difference from the case of playing a game with a game machine as an opponent cannot be sufficiently shown to the user. In other words, excitement based on the characteristic of net games that a game can be played not with a game machine but with an actual person cannot be sufficiently provided to the user.

SUMMARY OF THE INVENTION

To solve the above problems, it is an object of the present invention to provide a server device for net games which can give sufficient excitement to the user based on the characteristic of net games that can be played with an actual person, and net game management program, and net game management method using this device.

The present invention relates to a server device for net games which is communicably connected to a plurality of terminal devices used by users via a net work for managing a game played in a game space by the users using the terminal devices, comprising acquiring means for acquiring a message which a user set using the terminal device, and presenting means for presenting a message of one user acquired by the acquiring means to the terminal device of the other user at a predetermined time during a period when the users are playing a game using the terminal devices.

According to the present invention as described above, the server device for net games which is communicably connected to a plurality of terminal devices used by the users via a network for managing a game played in a game space by the users using the terminal devices comprises acquiring means for acquiring a message which a user set using the terminal device, and presenting means for presenting a message of one user acquired by the acquiring means to the terminal device of the other user at a predetermined time during a period when the users are playing a game using the terminal devices.

In other words, a message which a user set using the terminal device is acquired, and the acquired message of this user is presented to the terminal device of the other user during a predetermined time in a period when the users are playing a game using the terminal devices.

In this way, the message which one user set is presented to the other user at a predetermined time during the game period, so excitement can be provided to the game by presenting this message. The other user to whom the message is presented can return a message, which this user set, to the former user, so such an exchange of messages can further improve the excitement of the game. Also such messages reflect the sensitivity of the users who are actual people, so the user can sufficiently enjoy the actual feel of playing a game with an actual person.

These and other objects, features, and advantages of the present invention will become more apparent upon reading the following detailed description along with the accompanying drawings.

DESCRIPTION OF THE PREFERRED EMBODIMENTS

Figure 1:
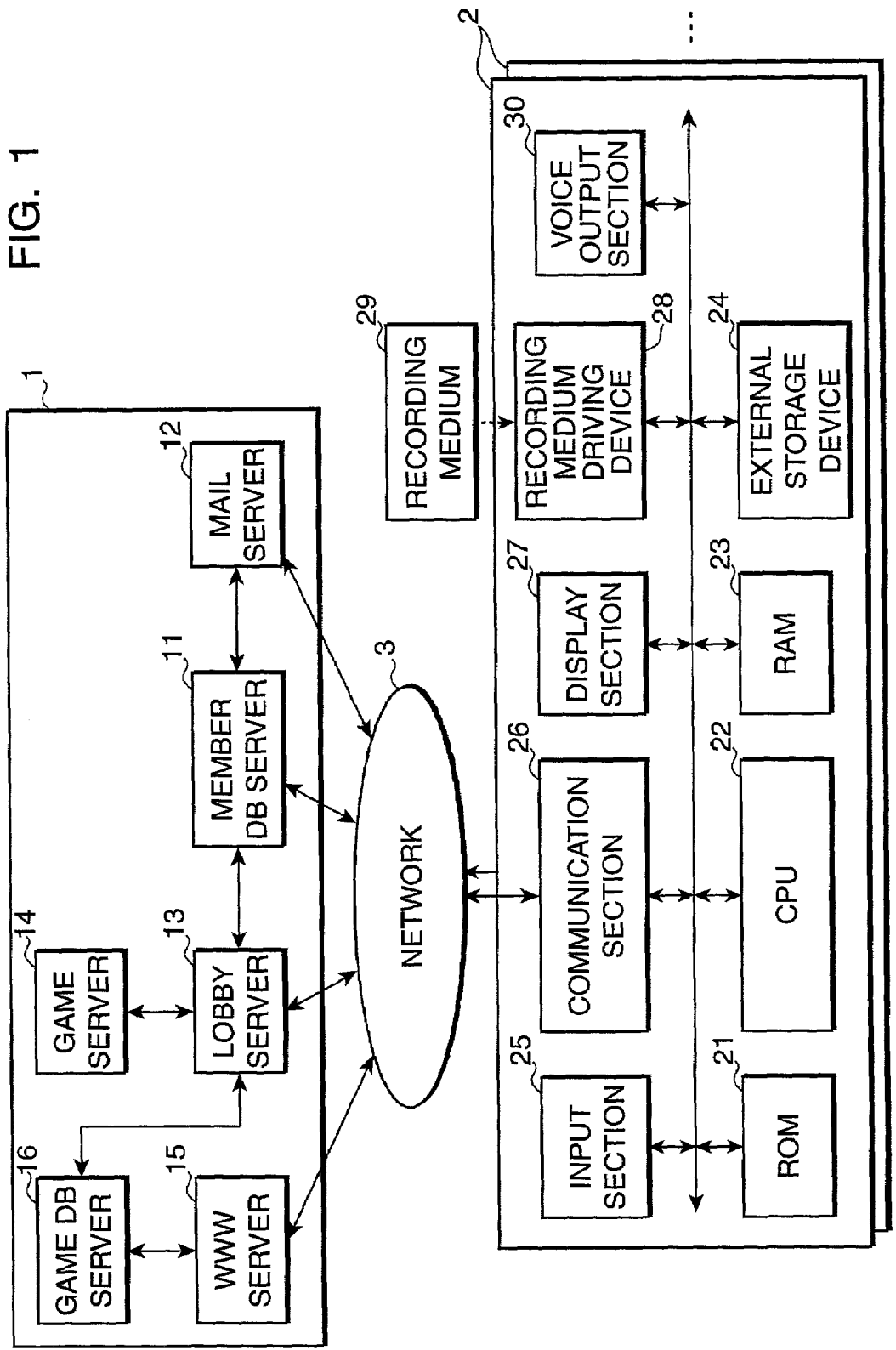
FIG. 1 is a block diagram depicting a configuration of the net game system using a server system according to an embodiment of the present invention.

A net game system using a server system according to an embodiment of the present invention will now be described with reference to the accompanying drawings. FIG. 1 is a block diagram depicting a configuration of a net game system using the server system according to an embodiment of the present invention.

In the following description, a baseball game when pre-registered members play games is described as an example of a net game, but the present invention is not limited by this example, but can be applied to various net games played between users, and can be suitably used for such games as other sports games, combat games, simulation games, shooting games and role playing games.

The net game system shown in FIG. 1 comprises a server system 1 and a plurality of client computers 2. The server system 1 and the plurality of client computers 2 are communicably inter-connected via a network 3. Each client computer 2 is a terminal device used by a member user, and the server system 1 is a server device for net games where a member manages a baseball game played in a game space using the client computer 2.

The Internet, for example, is used for the network 3, and various information is transmitted/received between the server system 1 and the client computer 2 according to TCP/IP (Transmission Control Protocol/Internet Protocol). The network 3 is not limited to the Internet, but another network, such as an intranet, or a network combining various networks including the Internet and an intranet may be used. The server system 1 and client computers 2 may be interconnected by a leased line.

When the Internet is used as the network 3, each client computer 2 is usually connected to a predetermined provider server via a modem, and is connected to the network 3 via this provider server, but to simplify description, the provider server is not illustrated and is not described here.

In the present embodiment, the user who uses the client computer 2 is a member who registered to receive a predetermined service provided by a company who manages the net game, and can play a baseball game as a net game with another member using the server system 1 using the client computer 2.

Here the net game has a normal game and an encounter league. A normal game is a profile exchange optional game where players can freely exchange profile information, and an encounter league is a game with profile exchange where players always exchange profile information.

Each member can voluntarily access the server system 1 using the client computer 2, and play a normal game and an encounter league in a game space constructed by the server system 1 and client computer 2, just like a normal baseball game, and the members playing games together in a normal game and an encounter league can exchange messages.

Now the server system 1 will be described in detail. The server system 1 comprises a member DB (data base) server 11, mail server 12, lobby server 13, game server 14, WWW (World Wide Web) server 15, and game DB server 16. Each server is connected by such a predetermined network as a LAN (Local Area Network), as illustrated, so that data can be transmitted/received according to the route. The member DB server 11, mail server 12, lobby server 13 and WWW server 15 are connected to the network 3 via a communication unit such as a router (not illustrated), for example.

The member DB server 11 is comprised of a normal data base server device, and executes member registration processing for a user when the user registers for membership to receive a predetermined service provided by a company who manages the net game. The member DB server 11 stores the member ID, password, and accounting information of each member which are decided at membership registration in the data base, and manages the information. The mail server 12 is comprised of a normal mail server device, and manages the electronic mail of each member.

The lobby server 13 is comprised of a normal server device, and executes various lobby processings as a portal site to play net games. For example, the lobby server 13 refers to the member ID and password stored in the member DB server 11 when the member accesses for playing a net game using the client computer 2, and executes authentication processing for the member who accessed.

The lobby server 13 guides the member who was confirmed as an official member by the authorization processing to the lobby selected by this member out of a plurality of lobbies, and in the lobby which the member was guided to, the lobby server 13 executes guide processing for guiding the member to the game area selected by this member out of a plurality of game areas, and the game is played in a game space of the game area where the member was guided to.

The lobby server 13 acquires a message which each member set using the client computer 2, and sends a message of one member to the client computer 2 of the other member, and sends a message of the other member to the client computer 2 of the former member at the start of the normal game and encounter league and during the batting/fielding change, so as to exchange messages between the members.

Here messages have a message at game start/during game, which is automatically presented at the game start and during a batting/fielding change, and a message during pitching, which is presented when a member presses a function key, which is an input key disposed at the client computer 2.

The game server 14 is comprised of a normal server device, executes net game progression processing for progressing the net game in a game space where members play a game, and transmits data required for the progression of the net game to the client computer 2 via the lobby server 13.

The game DB server 16 is comprised of a normal data base server device, and stores the various information on the net games, such as the game result, which the client computer 2 sent via the lobby server 13 to the data base, and manages the information.

The WWW server 15 is comprised of a normal WWW server device, creates ranking data from the data on game outcome stored in the game DB server 16, and lists the created ranking data on a predetermined home page so that the ranking data can be read from the client computer 2.

Now the client computer 2 will be described in detail. Each client computer 2 is comprised of a normal personal computer, which includes a ROM (Read Only Memory) 21, CPU (Central Processing Unit) 22, RAM (Random Access Memory) 23, external storage device 24, input section 25, communication section 26, display section 27, recording medium driving device 28, and voice output section 30.

Each block of the client computer 2 is connected to the internal bus, various data is input/output onboard the client computer 2 via this bus, and various processings for playing the net game are executed under the control of the CPU 22.

A basic program for operating the client computer 2 has been stored in the ROM 21. The RAM 23 is used for the work area of the CPU 22. The recording medium 29 is a recording medium which can be read by a computer, such as a CD-ROM. The CD-ROM is provided by a software manufacturer who creates net games, and stores the game progression program at the client side for a member to play a baseball game in the game space.

The recording medium driving device 28 is comprised of a CD-ROM drive, where the game progression program at the client side is read from the recording medium 29 under the control of the CPU 22, and the game progression program at the client side is installed in the external storage device 24.

The recording medium 29 is not limited to the above mentioned example, but if another recording medium driving device, such as a DVD drive or floppy disk drive, is added, the game progression program at the client side may be installed in the external storage device 24 using another recording medium which the computer can read, such as a DVD or floppy disk. If the game progression program at the client side can be downloaded from a home page of a software manufacturer via a network 3, then the game progression program at the client side may be directly downloaded from this home page to the external storage device 24.

The external storage device 24 is comprised of such an external storage device as a hard disk drive. The game progression program at the client side is installed in the external storage device 24, as mentioned above, and various programs, such as a moving picture reproduction program for reproducing 3-dimensional moving pictures according to the game progression program, are preinstalled by a normal method. Here for the moving picture reproduction program, Direct X by Microsoft, for example, can be used.

The CPU 22 reads a basic program from the ROM 21, and reads the game progression program at the client side and the moving picture reproduction program from the external storage device 24, executes net game progression processing to play a normal game and an encounter league, and transmits/receives necessary data to/from the server system 1 via the communication section 26.

The input section 25 is comprised of a keyboard and a mouse, and in the present embodiment, various instructions are input primarily using the mouse according to the operation of the member, and messages during pitching are assigned to predetermined function keys so that the instructions to present a message during pitching is input by pressing a function key.

The communication section 26 is comprised of a modem or a router, and controls communication with the server system 1 via the network 3. The display section 27 is comprised of a CRT (Cathode Ray Tube) or liquid crystal display, and displays various screens used for a net game as still pictures or moving pictures under the control of the CPU 22.

The voice output section 30 is comprised of a speaker, which outputs a message at game start/during game and a message during pitching by voice so as to present each message to the member.

Figure 2:
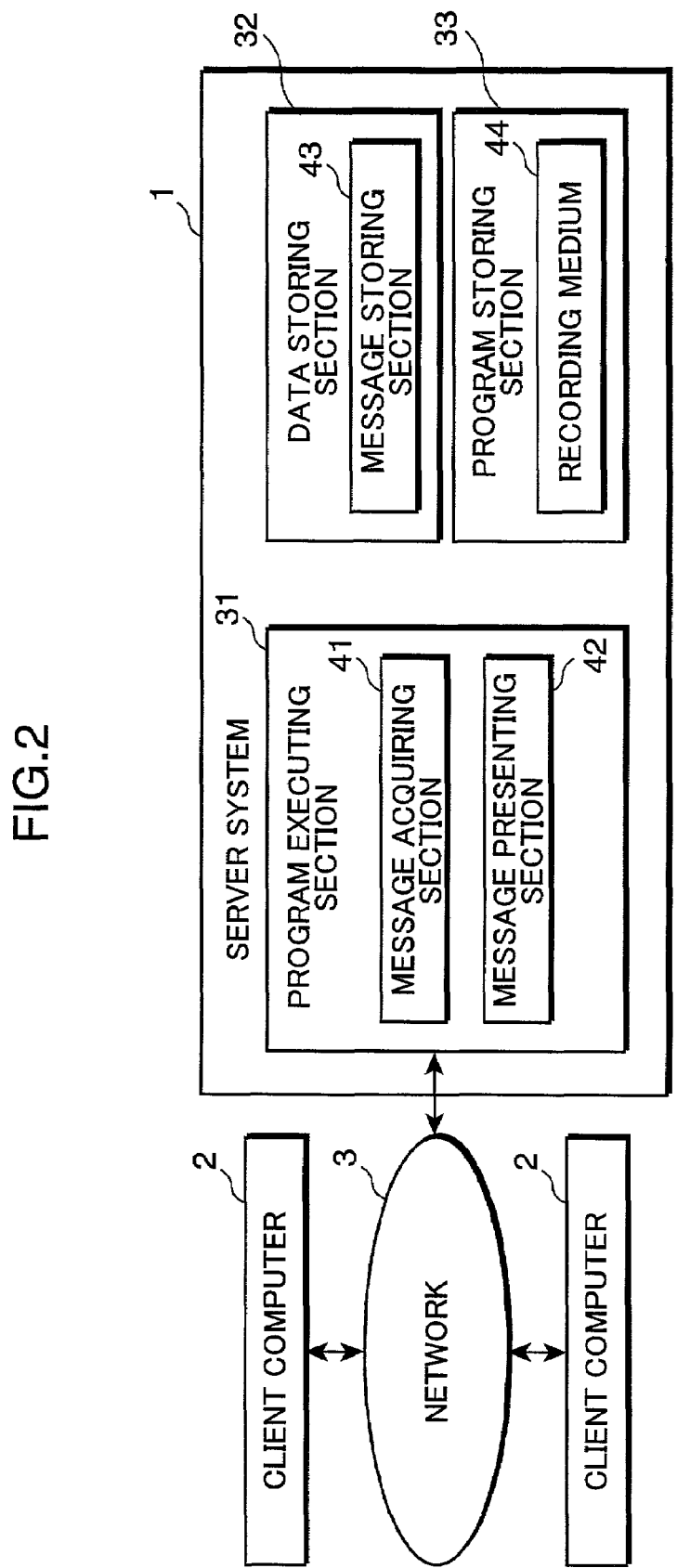
FIG. 2 shows the major functional blocks of the server system shown in FIG. 1.

Now the major functions of the server system 1 configured as above will be described. FIG. 2 shows the major functional blocks of the server system 1 shown in Fig.

As FIG. 2 shows, the server system 1 functionally includes the program executing section 31, data storing section 32, and program storing section 33. The program executing section 31 functionally includes the message acquiring section 41 and the message presenting section 42. The data storing section 32 functionally includes the message storing section 43. And the program storing section 33 includes the recording medium 44 which can be read by a computer.

The program executing section 31 is comprised of the CPUs (not illustrated) of each server 11–16 of the server system 1, and functions as the message acquiring section 41 and the message presenting section 42 by the CPUs executing various programs stored in the recording medium 44, and executing the programs.

The data storing section 32 is comprised of the RAM (not illustrated) of the lobby server 13. The message storing section 43 stores the messages at game start/during game and the messages during pitching, which the members set using the client computer 2, for each member.

The program storing section 33 is comprised of, for example, the hard disk drives (not illustrated) of each server of the server system 1, and in this case, the recording medium 44 is comprised of a hard disk. The recording medium 44 records the net game management programs, such as the message acquisition program, messages at game start/during game presentation program, messages during pitching presentation program, and other game progression programs at the server side in a state where the program can be read by a computer.

The recording medium 44 is not limited to the above example, but other recording mediums which can be read by a computer, such as a CD-ROM, DVD, and floppy disk, may be used if other recording medium driving devices, such as a CD-ROM drive, DVD drive, and floppy disk drive, can be used, and each of the above mentioned programs may be downloaded via the network 3, and may be stored in the hard disk.

The message acquiring section 41 is implemented primarily by the CPU of the lobby server 13, executing the message acquisition program. The message acquiring section 41 acquires a message at game start/during game which the member set using the client computer 2 out of the plurality of predetermined messages, and stores the acquired message at game start/during game in the message storing section 43 for each member.

The message acquiring section 41 also acquires a message during pitching which the member set out of a plurality of predetermined messages using the client computer 2 corresponding to the function keys of the input section 25, and stores the acquired message during pitching in the message storing section 43 corresponding to the function keys for each member.

The message presenting section 42 is implemented primarily by the CPU of the lobby server 13, executing the message presentation program at game start/during game and message presentation program during pitching. The message presentation section 42 sends the message at game start/during game of one member stored in the message storing section 43 to the client computer 2 of the other member at a predetermined time during a period when the members are playing a game using the client computers 2, such as at the start of the normal game and encounter league and batting/fielding change time. The voice output section 30 of the client computer 2 of the other member converts the transmitted message at game start/during game into voice, and outputs it.

When one member operates a function key of the input section 25 during the normal game and encounter league, the message presenting section 42 reads a message during pitching which corresponds to this function key from the message storing section 43, and sends the read message during pitching to the client computer 2 of the other member. The voice output section 30 of the client computer 2 of the other member converts the transmitted message at game start/during game into voice, and outputs it. According to the present embodiment, the lobby server 13 corresponds to the acquiring means and presenting means.

Now the operation of the net game system configured as mentioned above will be described. In the following description, it is assumed that the user has completed member registration to the member DB server 11, and the member ID and password of the member have been stored in the external storage device 24 of the client computer 2 to be used by the member, and have also been stored in and managed by the member DB server 11. It is assumed that playing a net game requires a fee, and that the accounting status shows that the member has already paid a predetermined fee, and has the right to play the net game.

When the member starts up the game progression program at the client side using the mouse of the input section 25 of the client computer 2, the mode select screen for the member to select a desired mode from a plurality of modes is displayed on the display section 27.

Figure 3:
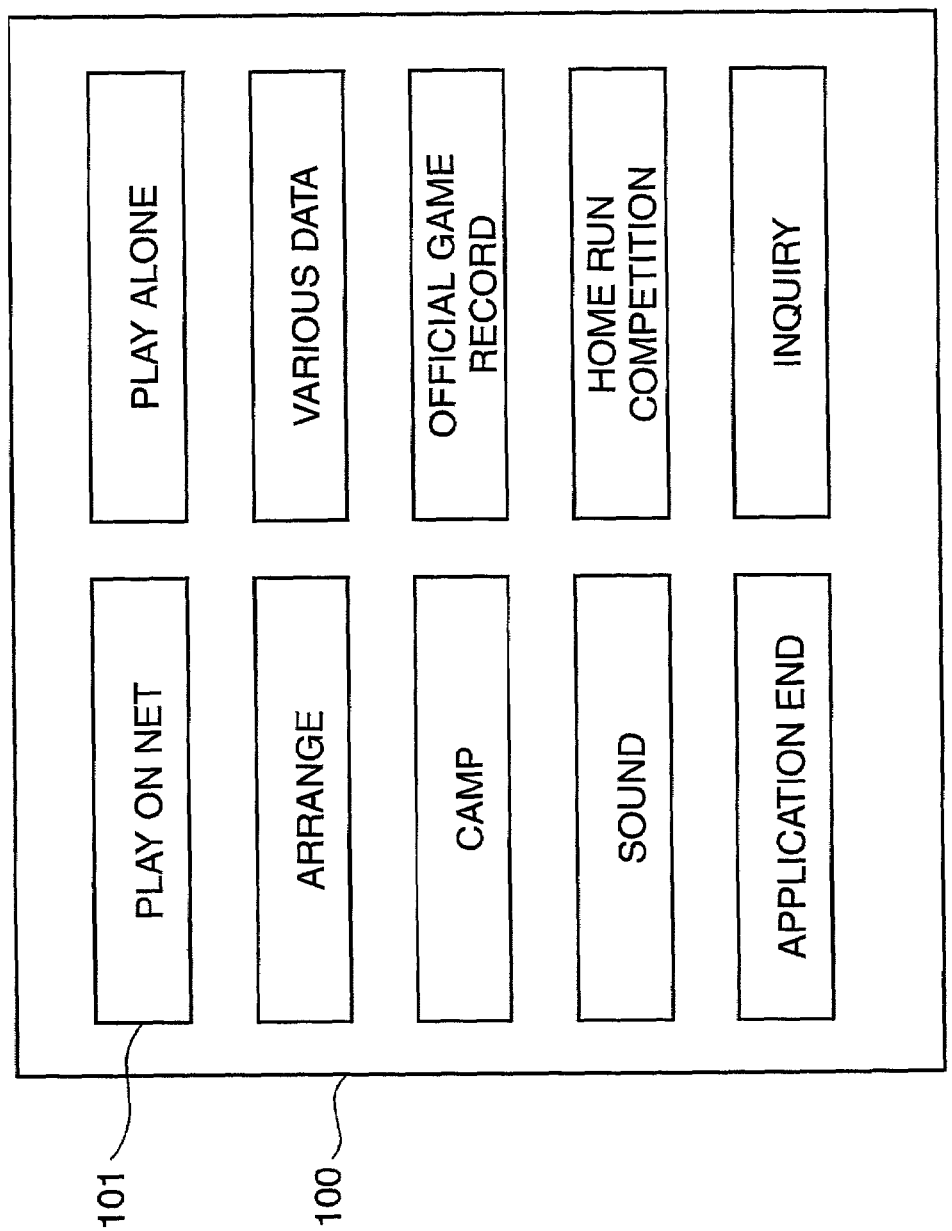
FIG. 3 is a diagram depicting an example of the mode select screen.

FIG. 3 is a diagram depicting an example of the mode select screen. When the mode select screen 100 shown in FIG. 3 is displayed and the member selects the "Play on Net" button 101 using the mouse, the sub-menu screen for the member to select a net game from a plurality of items of the sub-menu is displayed on the display section 27.

Figure 4:
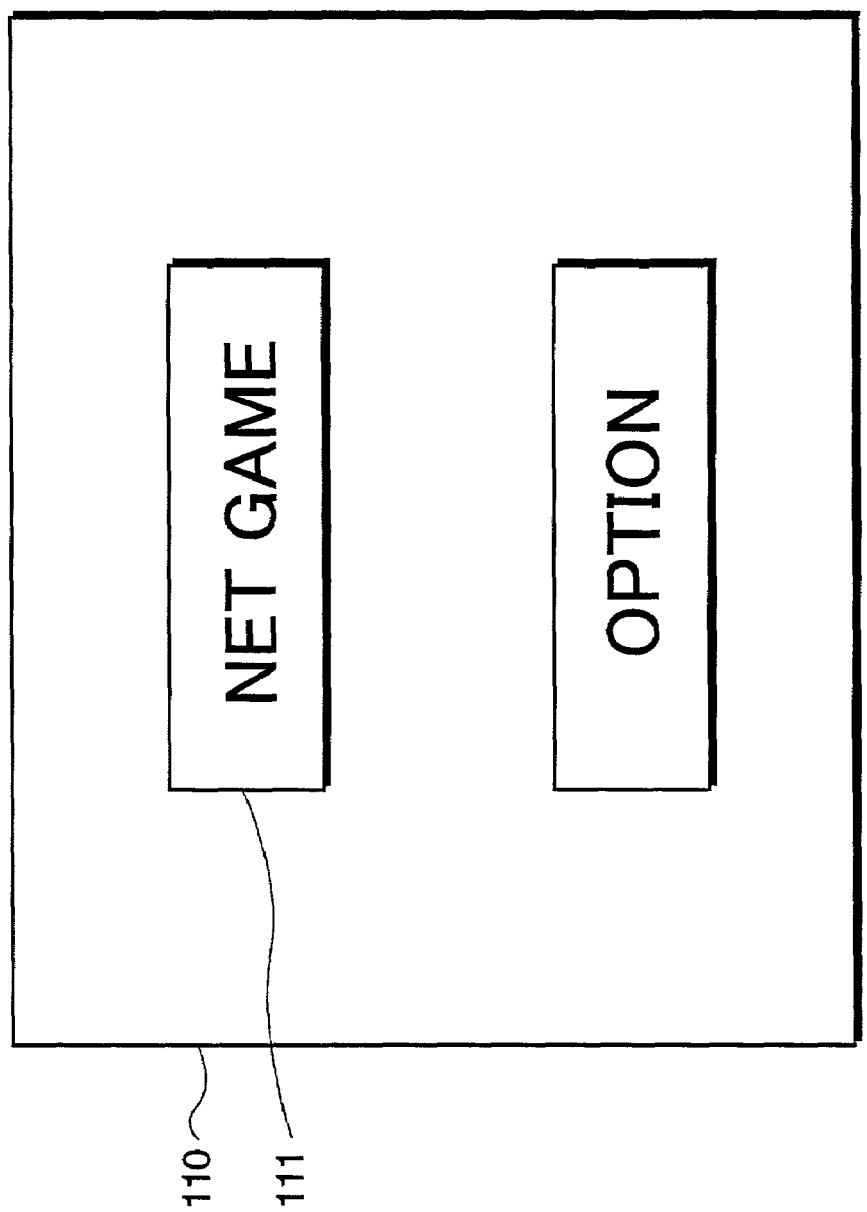
FIG. 4 is a diagram depicting an example of the submenu screen.

FIG. 4 is a diagram depicting an example of the sub-menu screen. When the sub-menu screen 110 shown in FIG. 4 is displayed, the member selects the "Net Game" button 111 using the mouse, and the profile information input screen for the member to input the profile information is displayed on the display section 27.

Figure 5:
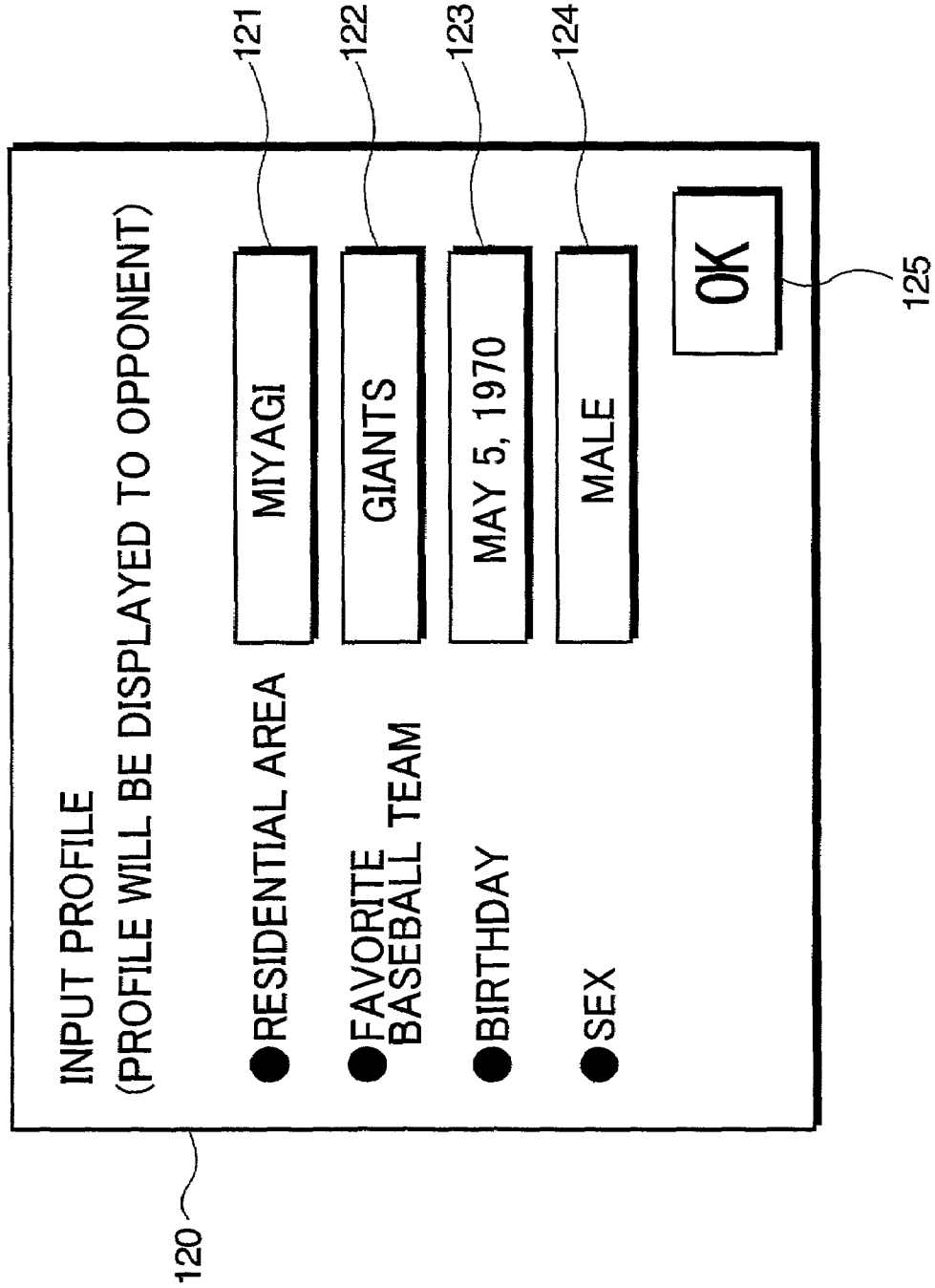
FIG. 5 is a diagram depicting an example of the profile information input screen.

FIG. 5 is a diagram depicting an example of the profile information input screen. When the profile information input screen 120 shown in FIG. 5 is displayed, and the member inputs each information to each input box 121–124 for the residential area, favorite baseball team, birth date and sex, and selects the "OK" button 125, the CPU 22 stores the input information on the residential area, favorite baseball team, birth date and sex in the RAM 21 or the external storage device 24 as profile information.

After the profile information is input as above, the team select screen, which the member will use for the net game, is displayed on the display section 27, and the CPU 22 stores the team name selected by the member in the RAM 21 or the external storage device 24.

Then the confirmation screen for rule setting and game setting to be used for the net game is displayed on the display section 27, where the member confirms the rule setting, etc. Here the rule setting is, for example, the number of innings in a game, whether extra innings are played in a game, whether a game can be called, and whether the DH system is used, and the game setting is, for example, the wind status, weather status, game time zone, error occurrence status, player condition status, and player injuries.

Figure 6:
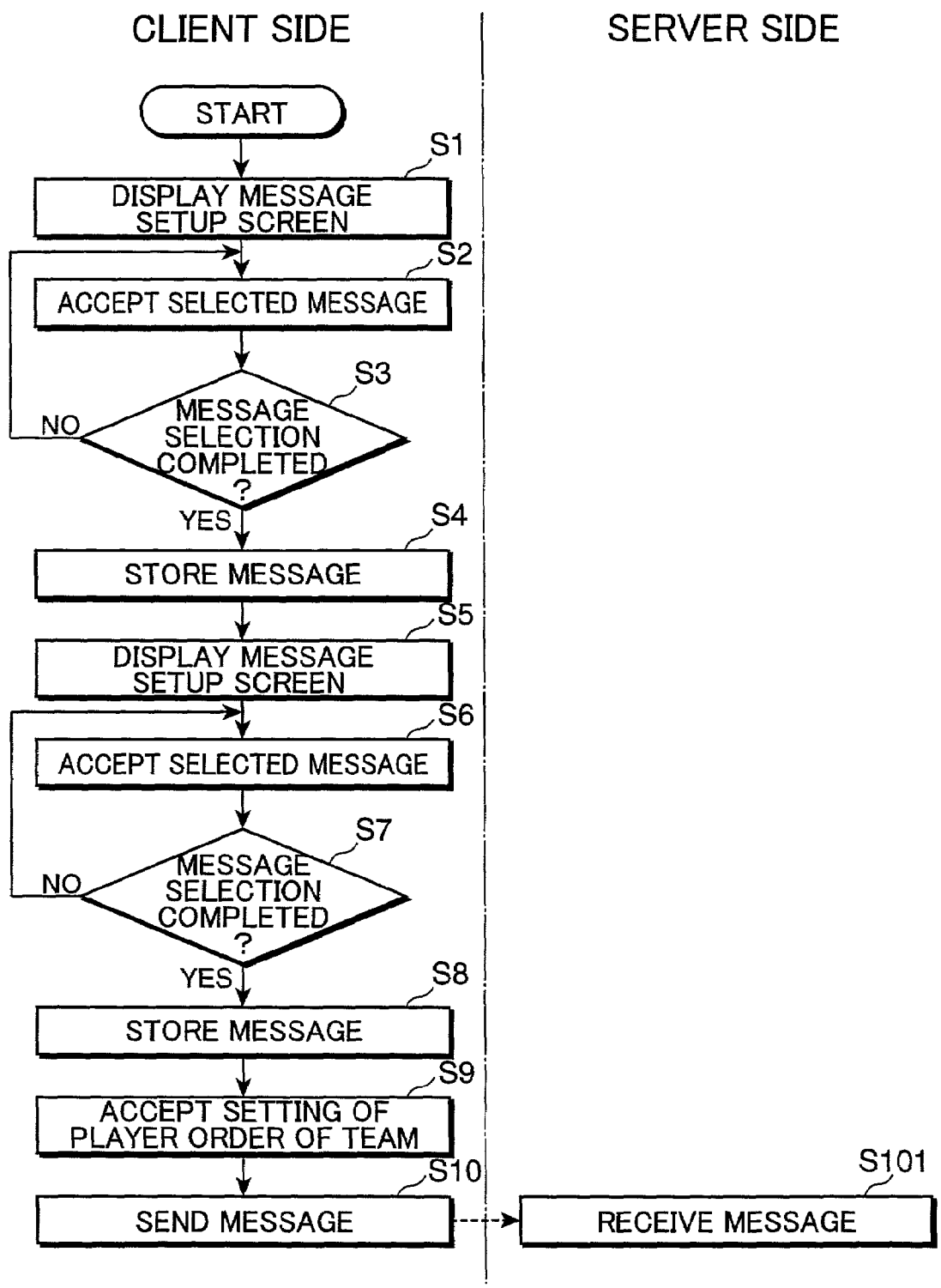
FIG. 6 is a flow chart depicting an example of message acquisition processing by the server system and the client computer shown in FIG. 1.

After the above mentioned rule setting and other processing ends, the message acquisition processing starts. FIG. 6 is a flow chart depicting an example of message acquisition processing by the server system 1 and client computer 2 shown in FIG. 1. The message acquisition processing at the client computer 2 side shown in FIG. 6 is implemented by the CPU 22, executing the game progression program, and the message acquisition processing at the server system 1 side is implemented by the lobby server 13, executing the message acquisition program.

As FIG. 6 shows, in Step S1, the CPU 22 of the client computer 2 displays the messages at the game start/during game setup screen on the display section 27 for setting the messages at game start/during game to be displayed at game start and at batting/fielding change time.

Figure 7:
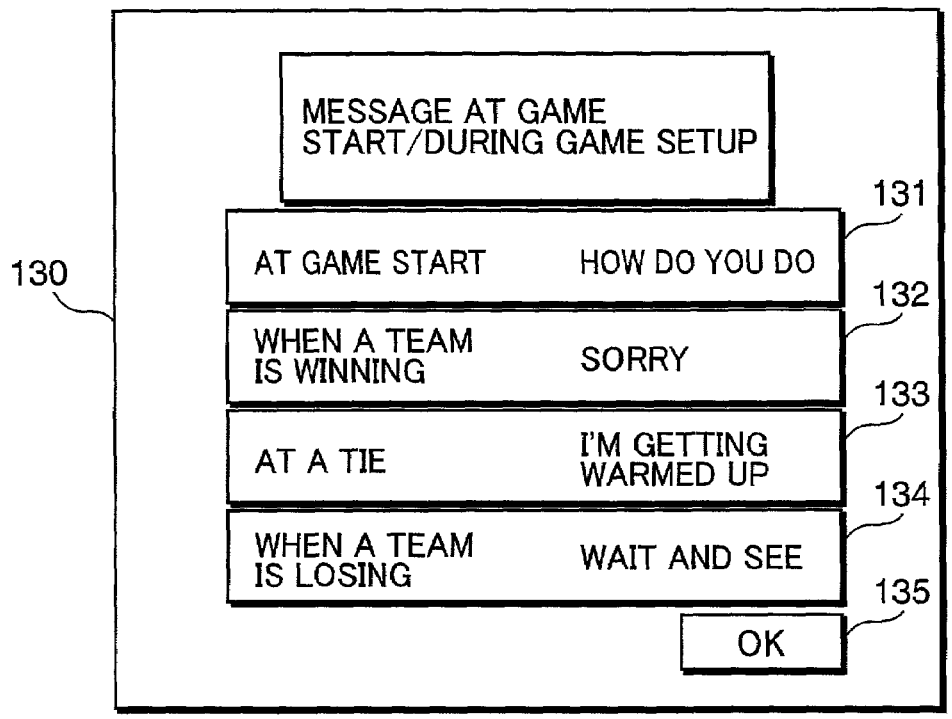
FIG. 7 is a diagram depicting an example of messages at game start time/and during game setup screen.

FIG. 7 is a diagram depicting an example of the messages at game start/during game setup screen. For example, the messages at game start/during game setup screen 130 shown in FIG. 7 are displayed, wherein "How do you do" is displayed in the message select box 131 at game start as the message at game start, "Sorry" is displayed in the message select box 132 when a team is winning as the message when a team is winning, "I'm getting warmed up" is displayed in the message select box 133 during a tie as the message during a tie game, and "Wait and see" is displayed in the message select box 134 when a team is losing as the message when a team is losing.

The above mentioned message at game start is a message which is automatically presented to the opponent at the game start, the message when a team is winning is a message which is automatically presented to the opponent when a team is winning at batting/fielding change time, the message at a tie is a message which is automatically presented to the opponent when the teams are in a tie at batting/fielding change time, and the message when a team is losing is a message which is automatically presented to the opponent when a team is losing at batting/fielding change time.

For each one of the above messages, the member can select a desired message out of a plurality of predetermined messages, and in the present embodiment, a selectable message is predetermined as follows.

The messages at game start are, for example, "Hi", "Take it easy please", "I'm a beginner", and "Good evening", in addition to the above message. The messages when a team is winning are, for example, "Is this all you've got?", "Are you sleepy?", "Are you serious?", "Do you want me to take it easy?", and "This is what I've got!", in addition to the above message. The messages when the teams are in a tie are, for example, "I'm just getting serious", "Revenge", "You are strong", and "Take it easy will you", in addition to the above message, and the messages when a team is losing are, for example, "You're pretty good", "I admit you're my rival", "You are strong", "I'll get a hit no matter what", and "Wow, you're strong aren't you", in addition to the above message.

In this baseball game, a game is normally played between members who do not know each other, so if the content of the message can be completely controlled by the members, then unfavorable messages, such as slander, may be exchanged, and the baseball game cannot progress smoothly. Therefore by presenting a message selected from a plurality of predetermined messages at game start/during game, the messages which the member can present to the opponent can be limited. By limiting the messages that the member can present to the opponent in this way, an exchange of unfavorable messages, such as slander, can be prevented, and the baseball game can progress smoothly. For this aspect, messages during pitching, which will be described later, are the same.

The messages at game start/during game are not limited by the above examples, and other messages may be used. The excitement of the game may be improved by displaying the above messages or other messages at a predetermined time, other than at game start and batting/fielding change time.

Then in Step S2, if the member selected messages at game start/during game out of the above mentioned message candidates using the mouse of the input section 25, the CPU 22 accepts the selected messages at game start/during game, and displays the selected messages in each select box 131–134.

Then in Step S3, the CPU 22 judges whether the member completed setting by selecting the "OK" button 135 shown in FIG. 7 using the mouse, and if the "OK" button 135 is not selected, processing moves to Step S2 to continue subsequent processing, and if the "OK" button 135 is selected, processing moves to Step S4.

If the "OK" button 135 is selected, the CPU 22 stores the messages at game start/during game, set in the RAM 21 or external storage device 24 in Step S4.

Then in Step S5, the CPU 22 displays the messages during pitching setup screen on the display section 27 for setting messages during pitching, which is presented when the member presses the function key when the pitching operation is executed.

Figure 8:
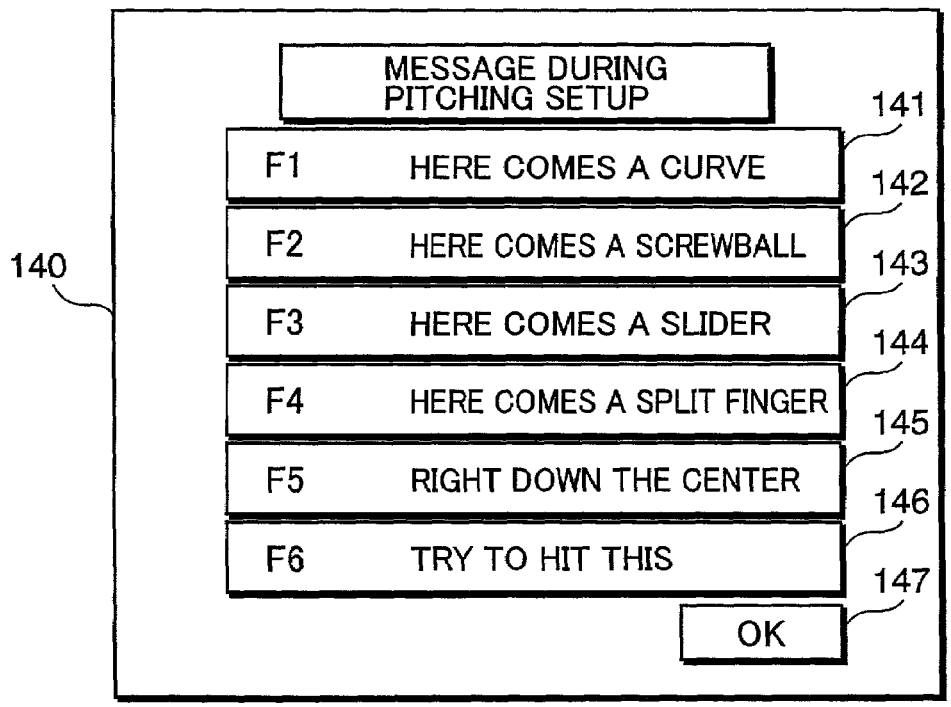
FIG. 8 is a diagram depicting an example of messages during pitching setup screen.

FIG. 8 is a diagram depicting an example of the messages during pitching setup screen. The messages during pitching setup screen 140 as shown in FIG. 8, for example, is displayed, and "Here comes a curve" is displayed in the message select box 141 of the F1 function key on the keyboard of the input section 25 as the message assigned to the F1 function key, and in the same way, messages such as "Here comes a screwball" are displayed in the message select boxes 142–146 of the F2–F6 function keys as the messages assigned to the F2–F6 function keys.

Each of the above messages are automatically presented to the member at the batting side by pressing a desired function key, F1–F6, when the member at the fielding side pitches a ball during the game. For each one of the above messages, the member can select a desired message from a plurality of messages which are predetermined for each function key F1–F6.

The messages during pitching are not limited to the above mentioned examples, but other messages may be used. The messages to be assigned to the above mentioned function keys are not limited to the above mentioned messages during pitching, but messages for a predetermined time other than pitching, such as messages for batting, may be presented during batting to improve the excitement of the game. The keys to which messages are assigned are also not limited to the above mentioned function keys, but messages may be assigned to other keys on the keyboard or messages may be assigned to predetermined buttons of a mouse or other input devices.

Then in Step S6, if the member selects messages during pitching out of the candidate messages using the mouse, the CPU 22 accepts the selected messages during pitching, and displays the selected messages during pitching in each select box 141–146.

Then in Step S8, the CPU 22 judges whether the member completed setting by selecting the "OK" button 147 shown in FIG. 8, and if the "OK" button 147 is not selected, processing moves to Step S6 to continue subsequent processing, and if the "OK" button 147 is selected, processing moves to Step S8.

If the "OK" button 147 is selected, the CPU 22 stores the messages during pitching, set in the RAM 21 or external storage device 24 corresponding to the function keys to which the messages are assigned in Step S8.

Then in Step S9, the CPU 22 accepts the setting of the player order of the team which the member will use for the net game, and stores the player order of the team, such as the starting order, players on the bench, and players not playing, in the RAM 21 or external storage device 24.

Then in Step S10, the client computer 2 accesses the lobby server 13 via the network 3, and the CPU 22 sends the member ID and password stored in the external storage device 24 to the lobby server 13 using the communication section 26, and sends the information stored in the RAM 21 or external storage device 24, such as the profile information, messages at game start/during game, messages during pitching, team name and team order, to the lobby server 13.

Then in Step S101, the lobby server 13 receives the transmitted messages at game time/during game and messages during pitching, inquires the member DB server 11 whether the member to which the received member ID and password are assigned has the right to play a game, and the member DB server 11 checks the accounting status of the member specified by the member ID and password, and notifies the result on whether the member has the right to play a game to the lobby server 13.

In this case, the member has the right to play a game, so the member DB server 11 notifies the lobby server 13 that this member has the right to play a game, and the lobby server 13 stores the received messages at game start/during game and messages during pitching in the RAM for each member, and stores such information as the team name and player order of the team in the game DB server 16 for each member, and ends message acquisition processing.

In this way, according to the present embodiment, various information, such as the team name and player order of the team, are collectively sent to the server system 1 after all the setup processing ends, so the connection time between the server system 1 can client computer 2 can be decreased, and unnecessary accounting fees are not charged.

When the above mentioned message acquisition processing ends, the lobby server 13 sends the data for displaying the game lobby select screen to select a desired game lobby to the client computer 2.

Figure 9:
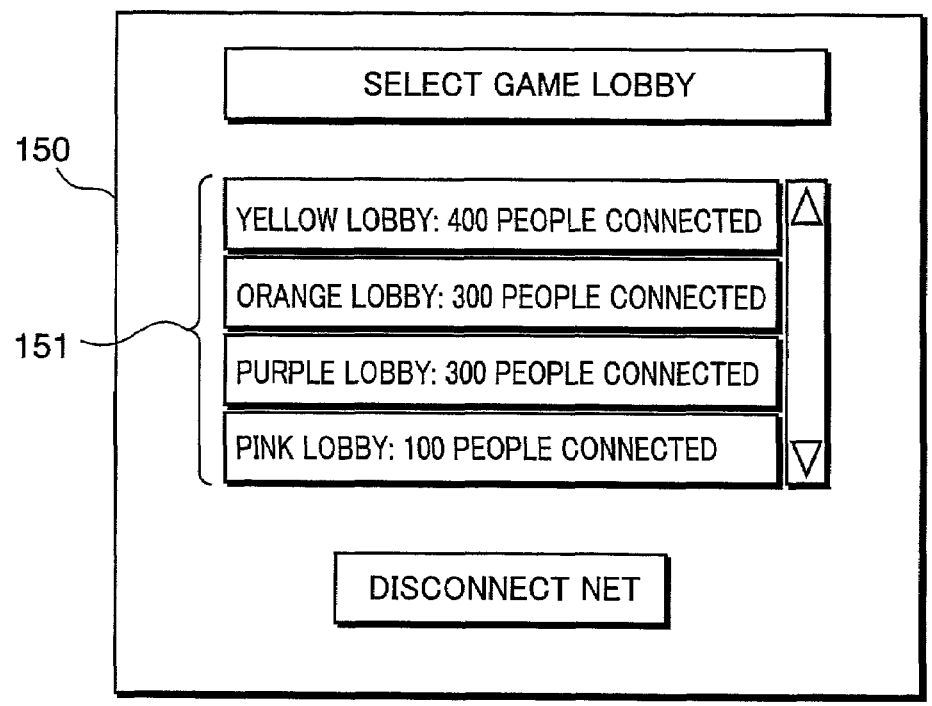
FIG. 9 is a diagram depicting an example of the game lobby select screen.

FIG. 9 is a diagram depicting an example of the game lobby select screen. The client computer 2 displays the game lobby select screen 150 shown in FIG. 9, for example, on the display section 27 using the received data, where a plurality of game lobby select buttons 151 are displayed.

The name of each game lobby is displayed and the number of members in each game lobby is displayed on the select buttons 151 of each game lobby. If the member selects a desired game lobby select button from the plurality of game lobby select buttons 151 using the mouse at this time, the lobby server 13 sends data, for displaying the game area select screen to select a desired game area out of a plurality of game areas, to the client computer 2.

Figure 10:
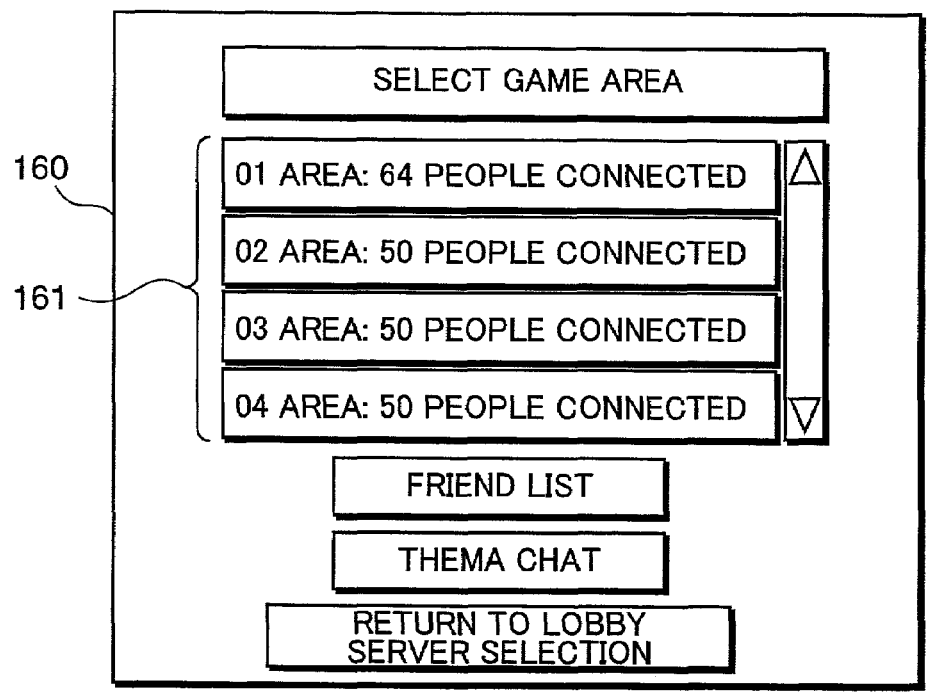
FIG. 10 is a diagram depicting an example of the game area select screen.

FIG. 10 is a diagram depicting an example of the game area select screen. The client computer 2 displays the game area select screen 160 shown in FIG. 10 on the display section 27 using the received data, where a plurality of game area select buttons 161 are displayed.

The name of each game area is displayed and the number of members in each game area is displayed on each game area select button 161. When the member selects a desired game area select button from the plurality of game area select buttons 161 using the mouse, the lobby server 13 sends the data, for displaying the game mode select screen to select the game mode, to the client computer 2.

Figure 11:
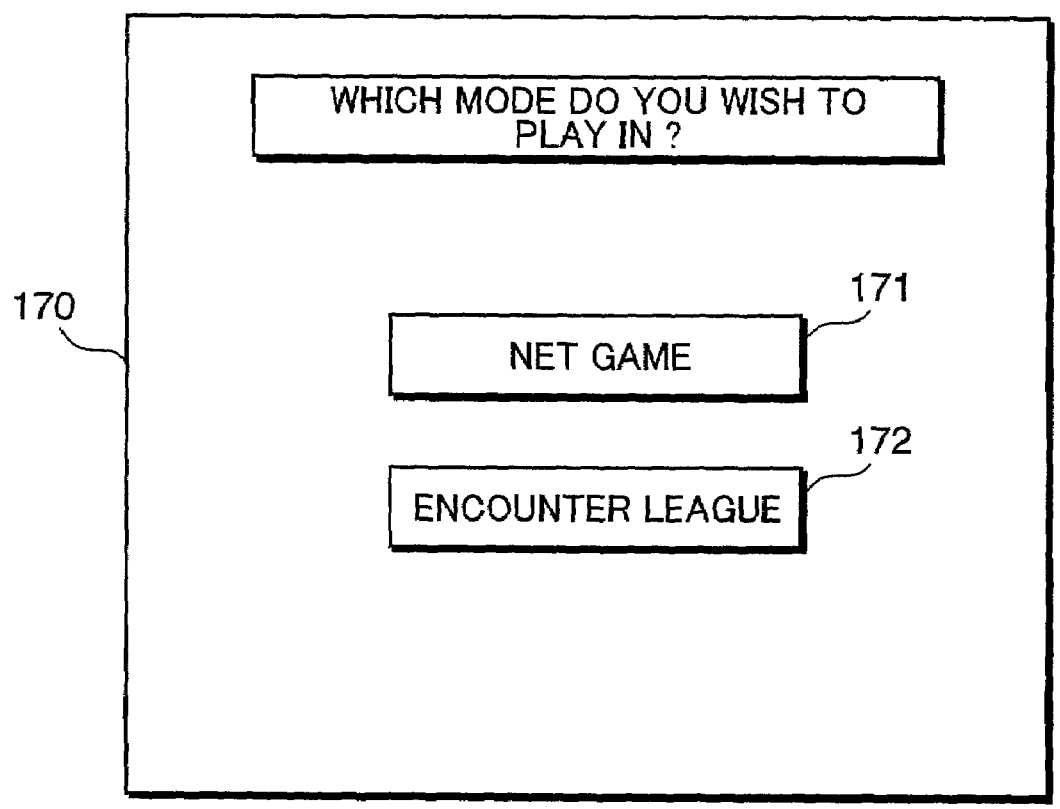
FIG. 11 is a diagram depicting an example of the game mode select screen.

FIG. 11 is a diagram depicting an example of the game mode select screen. The client computer 2 displays the game mode select screen 170 shown in FIG. 11, for example, on the display section 27 using the received data. If the member selects the "Net Game" button 171 or the "Encounter League" button 172 using the mouse at this time, the opponent is decided by a predetermined processing, and a baseball game as a net game or encounter league starts.

Now messages at game start/during game presentation processing, for exchanging messages at game start/during game between the members playing together in a net game or encounter league, will be described.

Figure 12:
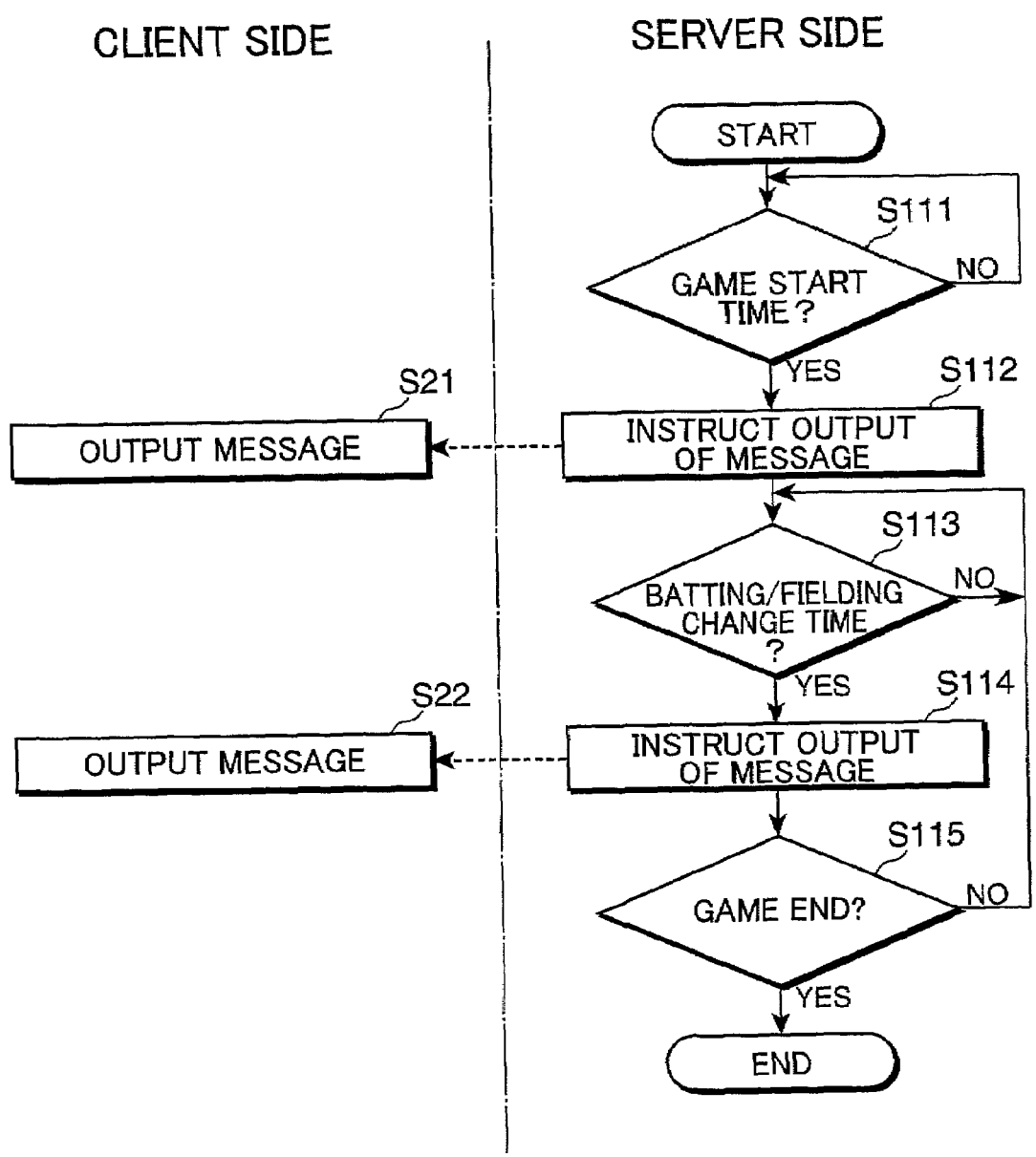
FIG. 12 is a flow chart depicting an example of messages at the game start/during game presentation processing by the server system and client computer shown in FIG. 1.

FIG. 12 is a flow chart depicting an example of messages at game start/during game presentation processing by the server system 1 and client computer 2 shown in FIG. 1. The messages at game start/during game presentation processing at the client computer 2 side shown in FIG. 12 is implemented by the CPU 22, executing the game progression program, and messages at game start/during game presentation processing at the server system 1 side is implemented by the lobby server 13, executing the messages at game start/during game presentation program.

As FIG. 12 shows, in Step S111, the lobby server 13 inquires the current game status to the game server 14, judges whether the current game status is game start time or not, and if not game start time, Step S111 is repeated, and if it is game start time, processing moves to Step S112.

In the case of game start time, the lobby server 13 reads the message at game start which one of the members who will play the game set from the RAM in Step S112, and instructs the client computer 2 of the other member to output the read message at game start by voice, and also reads the message at game start which the other member set from the RAM, and instructs the client computer 2 of the former member to output the read message at game start by voice.

At this time, in Step S21, the CPU 22 of the client computer 2 of the other member outputs the instructed message at game start of the former member by voice using the voice output section 30, and the CPU 22 of the client computer 2 of the former member outputs the instructed message at game start of the other member by voice using the voice output section 30. Therefore, the message at game start of the former member is presented to the other member by voice, and the message at game start of the other member is presented to the former member by voice.

Then in Step S113, the lobby server 13 inquires the current game status to the game server 14, judges whether the current status is batting/fielding change time or not, and if not batting/fielding change time, Step S113 is repeated, and if it is batting/fielding change time, processing moves to Step S114.

In the case of batting/fielding change time, the lobby server 13 inquires the current game status to the game server 14 in Step S114, and if one member is winning the game, the lobby server 13 reads the message when a team is winning which this member set from the RAM, and instructs the client computer 2 of the other member to output the read message when a team is winning by voice, and also reads the message when a team is losing which the other member set from the RAM, and instructs the client computer 2 of the former member to output the read message when a team is losing by voice.

When the game is tied, the lobby server 13 reads the message at a tie which one member set from the RAM, and instructs the client computer 2 of the other member to output the read message at a tie by voice, and also reads the message at a tie which the other member sets from the RAM, and instructs the client computer 2 of the former member to output the read message at a tie by voice.

At this time, in Step S22, the CPU 22 of the client computer 2 of the other member outputs the instructed message of the former member by voice using the voice output section 30, and the CPU 22 of the client computer 2 of the former member outputs the instructed message of the other member by voice using the voice output section 30. Therefore when one member is winning, the message when the team of this member is winning is presented to the other member by voice, and the message when the team of the other member is losing is presented to the former member by voice. When the game is tied, a message at a tie of one member is presented to the other member by voice, and a message at a tie of the other member is presented to the former member by voice.

Then in Step S115, the lobby server 13 inquires the current game status to the game server 14, judges whether the current status is game end, and if it is not game end, processing moves to Step S113 to repeat the subsequent processing, and if it is game end, the messages at game start/during game presentation processing ends.

By the above processing, each message which each member preset is exchanged at game start and at batting/fielding change time. Here at the game start and batting/fielding change time the game is not actually being played in the progress of the baseball game, so if nothing happens during such a time, the tension of the users in the baseball game is disrupted, and the excitement of the baseball game diminishes. However, according to the present embodiment, the members exchange messages, so the feeling of each member is refreshed, which allows each member to focus on the baseball game, and spicy excitement can be provided to the progression of the baseball game, which further improves the excitement of the baseball game.

Now messages during pitching presentation processing for presenting messages during pitching between the members playing a game together in the net game or encounter league will be described.

Figure 13:
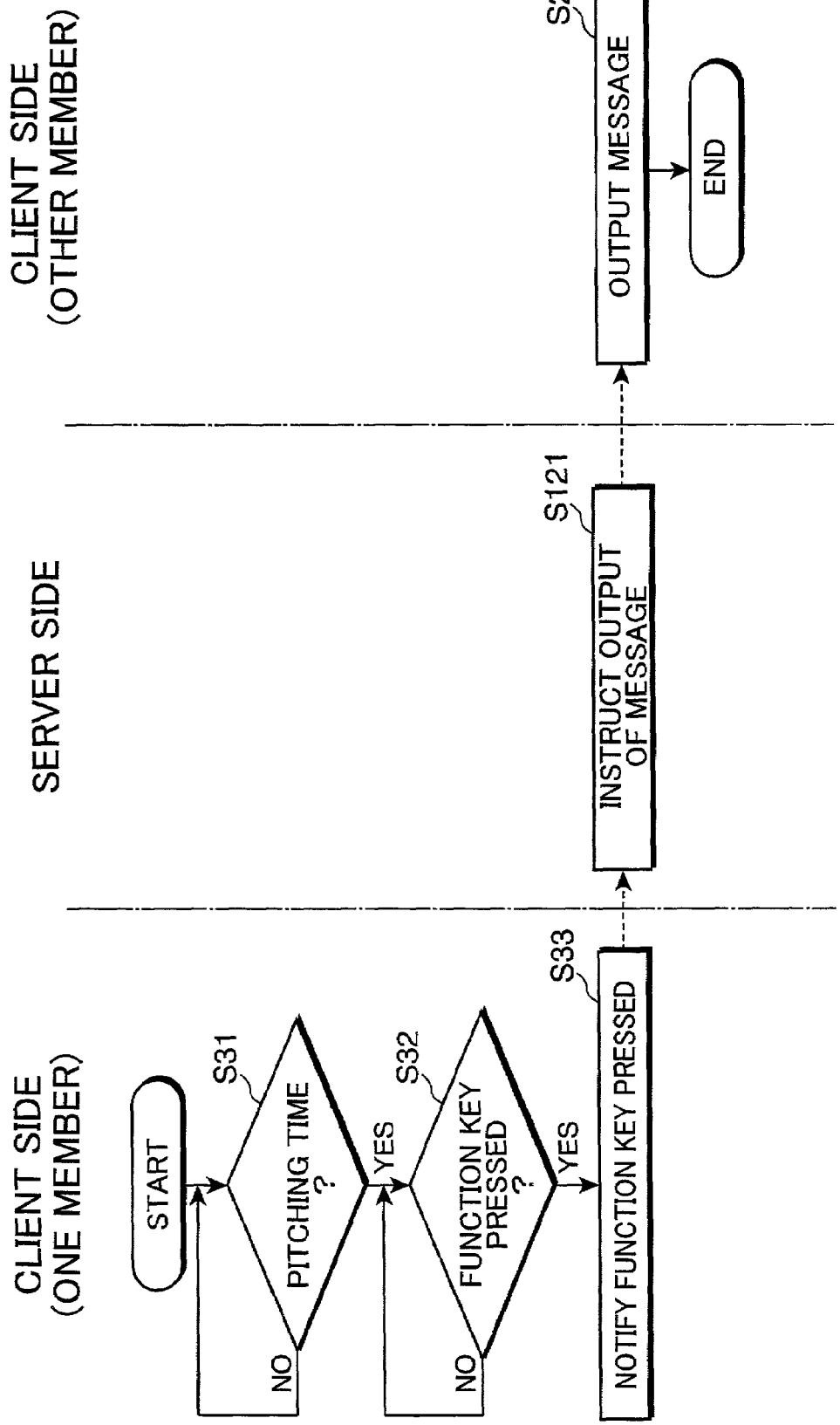
FIG. 13 is a flow chart depicting an example of messages during pitching presentation processing by the server system and client computer shown in FIG. 1.

FIG. 13 is a flow chart depicting an example of messages during pitching presentation processing by the server system 1 and client computer 2 shown in FIG. 1. The messages during pitching presentation processing at the client computer 2 side shown in FIG. 13 is implemented by the CPU 22, executing the game progression program, and the messages during pitching presentation processing at the server system 1 side is implemented by the lobby server 13, executing the messages during the pitching presentation program.

As FIG. 13 shows, in Step S31, the CPU 22 of the client computer 2 of one member playing the game judges whether this member is the fielding side and what the current game status is during pitching, and if this member is not the fielding side or the current game status is not during pitching, Step S31 is repeated, and if this member is the fielding side and the current game status is during pitching, processing moves to Step S32. The processing in Step S31 may be executed by the lobby server 13 after receiving the notification in Step S33, which is described later.

If one member is at the field side and the current game status is during pitching, the CPU 22 of the client computer 2 of this member judges whether this member pressed a function key of the input section 25 in Step S32, and if this member did not press a function key, Step S32 is repeated, and if this member pressed a function key, processing moves to Step S33.

When one member pressed a function key, the CPU 22 of the client computer 2 of this member notifies the information for specifying the pressed function key to the lobby server 13 using the communication section 26 in Step S33.

Then the lobby server 13 reads the message during pitching, which is stored corresponding to the pressed function key out of the messages during pitching which this member set from the RAM, and instructs the client computer 2 of the other member to output the read message during pitching by voice.

Then in Step S201, the CPU 22 of the client computer 2 of the other member outputs the instructed message during pitching of the former member by voice using the voice output section 30, and ends the messages during pitching presentation processing. Therefore the message during pitching which is assigned to the function key pressed by the former member is presented to the other member by voice.

The message during pitching of the other member is also presented to the former member in the same way.

When one member operated a function key during pitching by the above mentioned processing, the message during pitching which this member set corresponding to this function key is presented to the other member. When a net game is played, each member often operates the baseball game not by a dedicated controller for a game but with a keyboard, etc. So the member cannot perform complicated operation other than the operation of the baseball game, such as pitching operation, but such a simple operation as merely pressing a function key can be performed even during the baseball game.

Since a message during pitching corresponding to the function key which one member pressed is presented to the other member, as described above, the former member can present a desired message during pitching to the other member merely by executing such a simple operation as pressing the function key to which a message is assigned. As a result, a desired message during pitching can be presented by a very simple operation without interfering with the original operation of the baseball game, and the excitement of the baseball game can be further improved.

In this way, according to the present embodiment, a message which a member selected using the client computer 2 is acquired, and during the period when members are playing a game using the client computers 2, an acquired message of one member is presented to the client computer 2 of the other member, so excitement can be provided to the game by the presentation of messages. The other member to whom the message is presented can return a message which this member set to the former member, so such an exchange of messages further improves the excitement of the game. With such messages, the sensitivity of the member, who is an actual person, is reflected, so the members can sufficiently receive the sensation of playing with an actual person. As a result, the excitement of the game can be further improved by the presentation and exchange of messages, and excitement based on the characteristic of the game, which is playing a game with an actual person, can be sufficiently provided to the users.

According to the present embodiment, the messages selected by a member are sent to the lobby server 13, but the present invention is not limited by this example, and information which can specify a message, for example, may be sent. The presentation of a message is not limited to presentation by voice, and a message may be displayed on the game screen using the display section 27.

Also according to the present invention, a personal computer is used as the terminal device, but other terminal devices, such as a portable telephone and a portable information terminal, may be used only if the net game can be played on such a device.

Information to be transmitted/received between the server system 1 and client computer 2 may be encrypted using known encryption technology. In this case, the security of each information to be transmitted can be improved.

In the above description, the case when a member who paid a predetermined fee to play a net game was described, but the present invention can be applied in the same way to the case when unspecified users pay a fee using a prepaid card or when a net game can be played free of charge, where the same effect can be received.

In summary, the present invention relates to a server device for net games which is communicably connected to a plurality of terminal devices used by users via a net work for managing a game played in a game space by the users using the terminal devices. The server device comprises acquiring means for acquiring a message which a user set using the terminal device, and presenting means for presenting a message of one user acquired by the acquiring means to the terminal device of the other user at a predetermined time during a period when the users are playing a game using the terminal devices.

According to the present invention described above, the server device for net games which is communicably connected to a plurality of terminal devices used by the users via a network for managing a game played in a game space by the users using the terminal devices comprises acquiring means for acquiring a message which a user set using the terminal device, and presenting means for presenting a message of one user acquired by the acquiring means to the terminal device of the other user at a predetermined time during a period when the users are playing a game using the terminal devices.

In other words, a message which a user set using the terminal device is acquired, and the acquired message of this user is presented to the terminal device of the other user during a predetermined time in a period when the users are playing a game using the terminal devices.

In this way, the message which one user set is presented to the other user at a predetermined time during the game period, so excitement can be provided to the game by presenting this message. The other user to whom the message is presented can return a message, which this user set, to the former user, so such an exchange of messages can further improve the excitement of the game. Also such messages reflect the sensitivity of the users who are actual people, so the user can sufficiently enjoy the actual feel of playing a game with an actual person. As a result, the excitement of the game can be further improved by the presentation and exchange of messages, and the user can sufficiently receive the sensation of playing a game not with a game machine but with an actual person, so excitement based on the characteristic of net games, where a game is played with an actual person, can be sufficiently given to the user.

The present invention may have the feature that the presenting means presents the message of one user acquired by the acquiring means to the terminal device of the other user in at least one of the game start time and the batting/fielding change time during the game.

According to the present invention with the above feature, the presenting means presents the message of one user acquired by the acquiring means to the terminal device of the other user in at least one of the game start time and the batting/fielding change time during the game.

In other words, the acquired message of one user is presented to the terminal device of the other user in at least one of the game start time and the batting/fielding change time during the game. The game start time and the batting/fielding change time are times when the actual game is not played, so if nothing happens during these times, the tension of the users toward the game is interrupted, and the excitement of the game diminishes. However, by exchanging messages between the users during such a time, the users feel refreshed and can concentrate on the game again, and also spicy excitement can be added to the progress of the game. As a result, the user can feel refreshed and can focus on the game again, and spicy excitement can be provided to the progress of the game, so the excitement of the game can be further improved.

The present invention may be provided with the feature that the acquiring means acquires the message corresponding to an input key disposed on the terminal device, and the presenting means presents the message corresponding to the input key on the terminal device of the other user when one user operated the input key during the game.

According to the present invention with the above described feature, the acquiring means acquires the message corresponding to an input key disposed on the terminal device, and the presenting means presents the message corresponding to the input key on the terminal device of the other user when one user operated the input key during the game.

In other words, the message is acquired which corresponds to the input key disposed on the terminal device, and the message corresponding to the input key is presented to the terminal device of the other user when one user operated the input key during the game.

When a net game is played, a user often uses a standard computer, and the game is controlled mostly by the mouse and keyboard, rather than by a controller dedicated for games. So the user cannot perform complicated operations other than the operation required for the game, but such a simple operation as merely operating an input key can be performed even during the game.

Therefore by presenting a message, corresponding to an input key which one user operated, to the terminal device of the other user, as mentioned above, the user can present a desired message to the opponent merely by performing such a simple operation as operating an input key to which a message is assigned. As a result, the user can present a desired message to the opponent merely by a simple operation of operating an input key to which a message is assigned, so a desired message can be presented by a simple operation without interfering with the original operation of the game, and the excitement of the game can be further improved.

The present invention may be provided with the feature that the acquiring means acquires a message which the user selected using the terminal device out of a predetermined plurality of messages.

According to the present invention with the above described feature, the acquiring means acquires a message which the user selected using the terminal device out of a predetermined plurality of messages.

In other words, a message which the user selected using the terminal device out of a predetermined plurality of messages is acquired, and the acquired message of one user is presented to the terminal device of the other user at a predetermined time during the period when the users are playing a game using the terminal devices. In a network game, the game is generally played between anonymous users, so if the content of a message is completely controlled by the users, unfavorable messages, such as slander, may be exchanged, which makes it difficult to progress the net game smoothly.

Therefore, the messages that a user can present to the opponent can be limited by presenting a message selected from a predetermined plurality of messages, as mentioned above. And as a result, an exchange of unfavorable messages, such as slander, can be prevented by limiting the messages which a user can present to the opponent. As a result, messages which the user can present to the opponent can be limited in advance, so an exchange of unfavorable messages, such as slander, can be prevented, and a net game can progress smoothly.

The present invention also relates to a net game management method using a server device for net games which is communicably connected to a plurality of terminal devices used by users via a network for managing a game played in a game space by the users using the terminal devices, comprising a message acquiring step for the server device for net games to acquire a message which a user set using the terminal device, and a message presenting step for the server device for net games to present a message of one user acquired in the message acquiring step to the terminal device of the other user at a predetermined time during a period when the users are playing a game using the terminal devices.

According to the present invention in the method form, the network management method using a server device for net games which is communicably connected to a plurality of terminal devices used by the users via a network for managing a game played in a game space by the users using the terminal devices, comprises a message acquiring step for the server device for net games to acquire a message which a user set using the terminal device, and a message presenting step for the server device for net games to present a message of one user acquired in the message acquiring step to the terminal device of the other user at a predetermined time during a period when the users are playing a game using the terminal devices.

In other words, the message which a user set using the terminal device is acquired by the server device for net games, and the acquired message of one user is presented to the terminal device of the other user at a predetermined time during the period when the users are playing a game using the terminal devices.

In this way, the message which one user set is presented to the other user at a predetermined time during the game period, so excitement can be provided to the game by presenting this message. The other user to whom the message is presented can return a message, which the user has set to the former user, so such an exchange of messages can further improve the excitement of the game. Also such messages reflect the sensitivity of the users who are actual people, so the user can sufficiently enjoy the actually feel of playing a game with an actual person. As a result, the excitement of the game can be further improved by the presentation and exchange of messages, and the user can sufficiently receive the sensation of playing a game not with a game machine but with an actual person, so excitement based on the characteristic of net games, where a game is played with an actual person, can be sufficiently given to the user.

The present invention relates also to a net game management program for providing functions to a server device for net games which is communicably connected to a plurality of terminal devices used by the users via a network, for managing a game played in a game space by the users using the terminal devices, comprising acquiring means for acquiring a message which a user set using the terminal device, and presenting means for presenting a message of one user acquired by the acquiring means to the terminal device of the other user at a predetermined time during a period when the users are playing a game using the terminal devices.

According to the present invention in the above described form, the net game management program for providing functions to a server device for net games which is communicably connected to a plurality of terminal devices used by the users via a network, for managing a game played in a game space by the users using the terminal devices, comprises acquiring means for acquiring a message which a user set using the terminal device, and presenting means for presenting a message of one user acquired by the acquiring means to the terminal device of the other user at a predetermined time during a period when the users are playing a game using the terminal devices.

In other words, a message which one user set using the terminal device is acquired by the server device for net games, and the acquired message of one user is presented to the terminal device of the other user at a predetermined time during the period when the users are playing a game using the terminal devices.

In this way, the message which one user set is presented to the other user at a predetermined time during the game period, so excitement can be provided to the game by presenting this message. The other user to whom the message is presented can return a message which this user has set to the former user, so such an exchange of messages can further improve the excitement of the game. Also such messages reflect the sensitivity of the users who are actual people, so the user can sufficiently enjoy the actual feel of playing a game with an actual person. As a result, the excitement of the game can be further improved by the presentation and exchange of messages, and the user can sufficiently receive the sensation of playing a game not with a game machine but with an actual person, so excitement based on the characteristic of net games, where a game is played with an actual person, can be sufficiently given to the user.

This application is based on Japanese patent application serial no. 2001-162863, filed in Japan Patent Office on May 30, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A server device for games which is communicably connected to a plurality of terminal devices used by users, including first and second users respectively using first and second terminal devices, via a network for managing a baseball game played in a game space by the users as players using said terminal devices, said server device comprising:
   a game execution means for executing processing of said baseball game adapted for presenting a plurality of predetermined events including a start of a game and a switching of batting/fielding sides between the first and second users;
   a storing device for storing a plurality of predetermined messages associated with each of said predetermined events, the predetermined messages including the following:
      messages of a first message type to be presented at the start of the game;
      messages of a second tyne to be presented by a presenting player of the players when the presenting player is winning and the switching of batting/fielding sides occurs;
      messages of a third message type to be presented by the presenting player when the presenting player is losing and the switching of batting/fielding sides occurs; and
      messages of a fourth message type to presented by the presenting player when a score is even and the switching of batting/fielding sides occurs;
   a presenting device for presenting said predetermined messages to said first user on said first terminal device for allowing said first user to select one of the messages of each of the first, second, third, and fourth message types, and for presenting said predetermined messages to said second user on said second terminal device for allowing said second user to select one of the messages of each of the first, second, third, and fourth message types;
   acquiring means for acquiring the messages selected by the first and second users for each of the first, second, third, and fourth message types;
   a detection device for detecting an occurrence of said predetermined events;
   said presenting device automatically presenting to the second user on the second terminal device messages of the messages acquired by the acquiring means including:
      the message of the first message type selected by the first user when the detection device detects the predetermined event of the start of the game;
      the message of the second type selected by the first user when the first user is winning and the detection device detects the predetermined event of the switching of batting/fielding sides occurs;
      the message of the third type selected by the first user when the first user is losing and the detection device detects the predetermined event of the switching of batting/fielding sides occurs; and
      the message of the fourth type selected by the first user when the score is even and the detection device detects the predetermined event of the switching of batting/fielding sides occurs; and
   said presenting device automatically presenting to the first user on the first terminal device messages of the messages accuired by the acquiring means including:
      the message of the first message type selected by the second user when the detection device detects the predetermined event of the start of the game;
      the message of the second type selected by the second user when the second user is winning and the detection device detects the predetermined event of the switching of batting/fielding sides occurs;
      the message of the third type selected by the second user when the second user is losing and the detection device detects the predetermined event of the switching of batting/fielding sides occurs; and
      the message of the fourth type selected by the second user when the score is even and the detection device detects the predetermined event of the switching of batting/fielding sides occurs.

2. The server device for net games according to claim 1, wherein said acquiring means acquires said messages corresponding to operation of respective input keys disposed on said first terminal device, and, when the first user operates a respective one of said input keys during the game, said presenting means presents a message of said messages corresponding to the respective one of the input keys to the second terminal device of the second user.

3. The server device according to claim 1, further comprising a data storing device for storing the messages acquired from each of the users during a game set procedure, the messages including messages corresponding the game start time and the batting/fielding change time.

4. The server device according to claim 1, wherein:
said means for acquiring messages acquires from the first user a plurality of pitching messages corresponding to respective function keys on the first terminal device; and
said presenting means presents, to said second terminal device of said second user, ones of said plurality of pitching messages corresponding to a respective one of said function keys operated by said first user during a time when said first user is effecting pitching during said baseball game.

5. The server device according to claim 1, wherein said presenting means presents said messages to said second terminal device such that said messages are processed by a voice output section of said second terminal device and presented as audio output.

6. A game management method for a server device for games which is communicably connected to plurality of terminal devices used by users, including first and second users respectively using first and second terminal devices, via a network for managing a baseball game played in a game space by the users as players using said terminal devices, said method comprising:
   executing processing of said baseball game adapted for presenting a plurality of predetermined events including a start of a game and a switching of batting/fielding sides between the first and second users;
   storing a plurality of predetermined messages associated with each of said predetermined events, the predetermined messages including the following:
      messages of a first message type to be presented at the start of the game;
      messages of a second type to be presented by a presenting player of the players when the presenting player is winning and the switching of batting/fielding sides occurs;
      messages of a third message type to be presented by the presenting player when the presenting player is losing and the switching of batting/fielding sides occurs; and
      messages of a fourth message type to be presented by the presenting player when a score is even and the switching of batting/fielding sides occurs;
   presenting said predetermined messages to said first user on said first terminal device for allowing said first user to select one of the messages of each of the first, second, third, and fourth message types, and for presenting said predetermined messages to said second user on said second terminal device for allowing said second user to select one of the messages of each of the first, second, third, and fourth message types;
   acquiring the messages selected by the first and second users for each of the first, second, third, and fourth message types;
   detecting an occurrence of said predetermined events;
   automatically presenting to the second user on the second terminal device messages of the messages acquired including:
      the message of the first message type selected by the first user when the detection device detects the predetermined event of the start of the game;
      the message of the second type selected by the first user when the first user is winning and the detection device detects the predetermined event of the switching of batting/fielding sides occurs;
      the message of the third type selected by the first user when the first user is losing and the detection device detects the predetermined event of the switching of batting/fielding sides occurs; and
      the message of the fourth type selected by the first user when the score is even and the detection device detects the predetermined event of the switching of batting/fielding sides occurs; and
   automatically presenting to the first user on the first terminal device messages of the messages acquired including:
      the message of the first message type selected by the second user when the detection device detects the predetermined event of the start of the game;
      the message of the second type selected by the second user when the second user is winning and the detection device detects the predetermined event of the switching of batting/fielding sides occurs;
      the message of the third type selected by the second user when the second user is losing and the detection device detects the predetermined event of the switching of batting/fielding sides occurs; and
      the message of the fourth type selected by the second user when the score is even and the detection device detects the predetermined event of the switching of batting/fielding sides occurs.

7. The method according to claim 6, further comprising:
   acquiring said messages corresponding to operation of respective input keys disposed on said first terminal device; and
   presenting a message of said messages corresponding to a respective one of the input keys to the second terminal device of the second user when the first user operates the respective one of said input keys during the game.

8. The method according to claim 6, further comprising storing the messages acquired from each of the users during a game set procedure.

9. The method according to claim 6, wherein:
   said acquiring messages acquires from the first user a plurality of pitching messages corresponding to respective function keys on the first terminal device; and
   said presenting presents, to said second terminal device of said second user, ones of said plurality of pitching messages corresponding to a respective one of said function keys operated by said first user during a time when said first user is effecting pitching during said baseball game.

10. The method according to claim 6, wherein said presenting messages includes presenting said messages to said second terminal device such that said messages are processed by a voice output section of said second terminal device and presented as audio output.

11. A recording medium storing an executable program for effecting a net game management method for a server device for net games which is communicably connected to a plurality of terminal devices used by users, including first and second users respectively using first and second terminal devices, via a network for managing a baseball game played in a game space by the users as players using said terminal devices, said method comprising:
   executing processing of said baseball game adapted for presenting a plurality of predetermined events including a start of a game and a switching of batting/fielding sides between the first and second users;
   storing a plurality of predetermined messages associated with each of said predetermined events, the predetermined messages including the following:

messages of a first message type to be presented at the start of the game;

messages of a second type to be presented by a presenting player of the players when the presenting player is winning and the switching of batting/fielding sides occurs;

messages of a third message type to be presented by the presenting player when the presenting player is losing and the switching of batting/fielding sides occurs; and messages of a fourth message type to be presented by the presenting player when a score is even and the switching of batting/fielding sides occurs;

presenting said predetermined messages to said first user on said first terminal device for allowing said first user to select one of the messages of each of the first, second, third, and fourth message types, and for presenting said predetermined messages to said second user on said second terminal device for allowing said second user to select one of the messages of each of the first, second, third, and fourth message types;

acquiring the messages selected by the first and second users for each of the first, second, third, and fourth message types;

detecting an occurrence of said predetermined events;

automatically presenting to the second user on the second terminal device messages of the messages acquired including:

the message of the first message type selected by the first user when the detection device detects the predetermined event of the start of the game;

the message of the second type selected by the first user when the first user is winning and the detection device detects the predetermined event of the switching of batting/fielding sides occurs;

the message of the third type selected by the first user when the first user is losing and the detection device detects the predetermined event of the switching of batting/fielding sides occurs; and the message of the fourth type selected by the first user when the score is even and the detection device detects the predetermined event of the switching of batting/fielding sides occurs; and automatically presenting to the first user on the first terminal device messages of the messages acquired including:

the message of the first message type selected by the second user when the detection device detects the predetermined event of the start of the game;

the message of the second type selected by the second user when the second user is winning and the detection device detects the predetermined event of the switching of batting/fielding sides occurs;

the message of the third type selected by the second user when the second user is losing and the detection device detects the predetermined event of the switching of batting/fielding sides occurs; and the message of the fourth type selected by the second user when the score is even and the detection device detects the predetermined event of the switching of batting/fielding sides occurs.

12. The recording medium according to claim 11, wherein the method further comprises:

acquiring said messages corresponding to operation of respective input keys disposed on said first terminal device; and presenting a message of said messages corresponding to a respective one of the input keys to the second terminal device of the second user when the first user operates the respective one of said input keys during the game.

13. The recording medium according to claim 11, wherein the method further comprises storing the messages acquired from each of the users during a game set procedure.

14. The recording medium according to claim 11, wherein:

said acquiring messages acquires from the first user a plurality of pitching messages corresponding to respective function keys on the first terminal device; and said presenting presents, to said second terminal device of said second user, ones of said plurality of pitching messages corresponding to a respective one of said function keys operated by said first user during a time when said first user is effecting pitching during said baseball game.

15. The recording medium according to claim 11, wherein said presenting messages includes presenting said messages to said second terminal device such that said messages are processed by a voice output section of said second terminal device and presented as audio output.

* * * * *